(12) United States Patent
Cranor et al.

(10) Patent No.: US 8,584,590 B2
(45) Date of Patent: Nov. 19, 2013

(54) COMBINED THERMAL AND CHEMILUMINESCENT REACTION SYSTEM

(75) Inventors: Earl Cranor, Longmeadow, MA (US); Linda Jacob, Woodbridge, CT (US)

(73) Assignee: Cyalume Technologies, Inc., West Springfield, MA (US)

( * ) Notice: Subject to any disclaimer, the term of this patent is extended or adjusted under 35 U.S.C. 154(b) by 219 days.

(21) Appl. No.: 12/844,158

(22) Filed: Jul. 27, 2010

(65) Prior Publication Data

US 2011/0017091 A1    Jan. 27, 2011

Related U.S. Application Data

(60) Provisional application No. 61/228,861, filed on Jul. 27, 2009.

(51) Int. Cl.
*F42B 12/40*    (2006.01)
*F21K 2/06*    (2006.01)

(52) U.S. Cl.
USPC .............................. 102/513; 362/34; 362/84

(58) Field of Classification Search
USPC ........ 102/513; 362/34, 84; 116/211; 43/17.5, 43/17.6; 446/219
See application file for complete search history.

(56) References Cited

U.S. PATENT DOCUMENTS

| | | | | |
|---|---|---|---|---|
| 3,728,270 A | * | 4/1973 | Bens et al. | 252/700 |
| 3,816,326 A | | 6/1974 | Bollyky | |
| 3,888,785 A | * | 6/1975 | Tatyrek et al. | 252/700 |
| 3,933,488 A | * | 1/1976 | Noguchi et al. | 430/97 |
| 4,626,383 A | * | 12/1986 | Richter et al. | 252/700 |
| 5,018,450 A | * | 5/1991 | Smith | 102/513 |
| 5,238,610 A | * | 8/1993 | Thompson | 252/700 |
| 5,281,367 A | | 1/1994 | Schleck et al. | |
| 5,298,197 A | * | 3/1994 | Thompson | 252/700 |
| 5,348,690 A | * | 9/1994 | Cohen et al. | 252/700 |
| 5,488,544 A | * | 1/1996 | Ladyjensky | 362/34 |
| 5,508,893 A | * | 4/1996 | Nowak et al. | 362/34 |
| 5,552,968 A | * | 9/1996 | Ladyjensky | 362/34 |
| 6,497,181 B1 | * | 12/2002 | Manole et al. | 102/513 |
| 6,619,211 B1 | * | 9/2003 | Haeselich | 102/513 |
| 6,931,993 B1 | * | 8/2005 | Manole et al. | 102/458 |
| 6,990,905 B1 | * | 1/2006 | Manole et al. | 102/513 |
| RE40,482 E | * | 9/2008 | Haeselich | 102/513 |
| 7,487,728 B2 | * | 2/2009 | Cranor | 102/513 |
| 7,964,119 B2 | * | 6/2011 | Bindra et al. | 252/700 |
| 2002/0134274 A1 | * | 9/2002 | Martinez et al. | 102/513 |
| 2005/0080465 A1 | * | 4/2005 | Zelickson et al. | 607/88 |
| 2005/0237730 A1 | * | 10/2005 | Barnes | 362/34 |

(Continued)

OTHER PUBLICATIONS

PCT Search Report and Written Opinion issued in related Application No. PCT/US2010/043334, mailed Oct. 14, 2010, 10 pages.

*Primary Examiner* — Bret Hayes
*Assistant Examiner* — Joshua Freeman
(74) *Attorney, Agent, or Firm* — Finnegan, Henderson, Farabow, Garrett & Dunner, LLP

(57) ABSTRACT

A multiple-part marking system that comprises at least one first part comprising at least one oxalate ester, at least one fluorescer, and at least one inorganic salt; and at least one second part comprising at least one peroxide and at least one catalyst, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate. Light and heat are emitted when the two parts interact.

14 Claims, 1 Drawing Sheet

(56) References Cited

U.S. PATENT DOCUMENTS

| | | | |
|---|---|---|---|
| 2006/0032393 A1* | 2/2006 | Haeselich | 102/502 |
| 2007/0079722 A1* | 4/2007 | Parish | 102/513 |
| 2007/0119329 A1* | 5/2007 | Haeselich | 102/498 |
| 2008/0035006 A1* | 2/2008 | Ciesiun et al. | 102/513 |
| 2008/0053330 A1* | 3/2008 | Haeselich | 102/513 |
| 2008/0229964 A1 | 9/2008 | Cranor | |
| 2010/0175577 A1* | 7/2010 | Ladyjensky | 102/513 |
| 2010/0282118 A1* | 11/2010 | Ladyjensky et al. | 102/513 |
| 2012/0097063 A1* | 4/2012 | Cranor et al. | 102/513 |
| 2012/0180686 A1* | 7/2012 | Jones et al. | 102/365 |

\* cited by examiner

COMBINED THERMAL AND CHEMILUMINESCENT REACTION SYSTEM

The present disclosure relates to markers and signals comprising a combined chemiluminescent and exothermic reaction. The markers and signals can be used in military and non-military training, and in tactical operations.

Markers are used by both military and non-military organizations in training, tactical operations, and on the battlefield. The markers act to visually identify targets such as the ground location of enemy equipment and vehicles. Additionally, tracers are employed that allow an observer to visually trace a projectile's trajectory, such as after the firing of munitions. Chemiluminescent markers and tracers emit light in the visible or infrared spectrum as the result of a chemical reaction. One such reaction is the activation of a fluorescer with hydrogen peroxide in the presence of a catalyst.

Military forces participating in night operations are normally equipped with various different types of vision devices, including night vision goggles, thermal goggles, and thermal cameras. Frequently, personnel within one unit will be equipped with different types of vision devices. For example, a troop carrier may have a gunner using thermal goggles and troops using night vision goggles. A marker that emits a chemiluminescent signal will be visible to the troops with night vision goggles, but not to the gunner. Similarly, the gunner with thermal goggles will be able to see a heat marker, but the troops will not. Additionally, there may be variations within the night vision goggles with regard to what micron wavelength the goggles operate in, leading to a variation in the wavelengths of light that are visible. Currently, there is not one marker that would be visible with all of the different types of vision devices that military personnel may be equipped with. There is therefore a need for such a marker that may be visible with thermal and/or night vision devices.

It is accordingly an object of the disclosure to provide a chemiluminescent and thermal system that is visible to personnel employing both thermal goggles and night vision goggles. This can be achieved by employing a multiple-part system that can emit light and heat upon activation, at least a first part comprising at least one oxalate ester, at least one fluorescer, and at least one inorganic salt, and at least a second part comprising at least one peroxide and at least one catalyst.

Chemical light systems employing an oxalate ester, a peroxide, a fluorescer, and a catalyst are generally known to those skilled in the art. Also known to those skilled in the art is the temperature sensitivity of such a system. A disadvantage of typical oxalate ester chemical light systems is that they generate no detectable light at temperatures below the freezing point of water. There is therefore a need for an oxalate ester chemical light system that is less affected by low ambient temperatures.

It is accordingly an object of the disclosure to provide a combined chemiluminescent and exothermic reaction that generates usable light at temperatures that occur in the normal environment.

Generally, the present disclosure provides markers and signals comprising a multiple-part system, which upon activation emits light and heat, and methods of using such markers and signals. More specifically, it has been discovered that the use of certain inorganic salts in an oxalate ester/peroxide based chemiluminescent system generates heat in addition to light, sufficient to act as a visual and thermal marker.

One aspect of the disclosure is a multiple-part marking system that comprises at least one part comprising at least one oxalate ester, at least one fluorescer, and at least one inorganic salt, and at least a second part comprising at least one peroxide and at least one catalyst, wherein light and heat are emitted when the two parts interact, and wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate. In another aspect of the disclosure, light and heat are emitted instantly when the two parts intermix. In another aspect of the disclosure, the system reaches a peak emission of light and heat when the two parts of the system are completely mixed. Another aspect of the disclosure is directed to emitting light at multiple wavelengths, including multiple wavelengths in the infrared spectrum, the visible spectrum, or a combination thereof.

In another aspect of the disclosure, the multiple-part marking system comprises carrier solvents for the first part and the second part. Another aspect of the disclosure comprises additional components of the marking system. Such additional components can include thickeners to allow the marker to stick to the target better, fluorescent powders for day time target marking, and antifreeze agents to prevent freezing.

In another aspect of the disclosure, one part of the multiple-part system is contained inside a housing which keeps the at least first part of the marking system separate from the at least second part of the marking system, until such time as mixing is desired. Another aspect of the disclosure includes the multiple-part marking system being housed within hollow flexible plastic tubing, wherein the at least one part of the marking system is contained within the hollow flexible tubing, and wherein the at least second part is contained inside a sealed glass vial which is located within the flexible tubing containing the first part, wherein upon breaking of the glass vial, the two parts would intermix.

Another aspect of the disclosure is directed to a projectile comprised of a multiple-part chemiluminescent and thermal marker within the projectile, wherein the multiple-part chemiluminescent and thermal marker comprises at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate; at least one breakable barrier separating the at least one first part from at least one second part comprising at least one peroxide and at least one catalyst; wherein light and heat are emitted when the at least one breakable barrier is broken.

Yet another aspect of the disclosure is directed to a method of marking a target comprising:

a) launching a projectile containing a multiple-part chemiluminescent and thermal marking system, wherein at least one first part of the multiple-part chemiluminescent and thermal marking system comprises at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, at least one breakable barrier separating the at least one first part from at least a second part comprising at least one peroxide and at least one catalyst;

b) breaking the at least one breakable barrier between the at least one first part and the at least one second part;

c) generating light and heat as products of the reaction between the at least first part and the at least second part; and d) marking a target hit by the projectile with the activated multiple-part chemiluminescent and thermal marking system.

A further aspect of the disclosure is directed to method of signaling comprising activating a multiple-part chemiluminescent and thermal marking system by mixing at least one first part comprising at least one oxalate ester, at least one fluorescer, and at least one inorganic salt with at least one second part comprised of at least one peroxide and at least one catalyst and generating light and heat; wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate. In certain of these embodiments, the multiple-part chemiluminescent and thermal marking system is present in hollow flexible tubing, wherein the at least one first part is present within the tubing, and wherein the flexible tubing also comprises at least one sealed glass vial containing the at least one second part; and wherein the parts are mixed as a result of the tubing being flexed and the glass vial breaking and releasing the at least one second part, causing it to mix and react with the at least one first part.

Additional objects and advantages of the disclosure will be set forth in part in the description which follows, and in part will be obvious from the description, or may be learned by practice of the disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawing, which is incorporated in and constitute a part of this specification, illustrate one embodiment of the disclosure and together with the description, serve to explain the principles of the disclosure.

DESCRIPTION OF THE EMBODIMENTS

Figure 1:
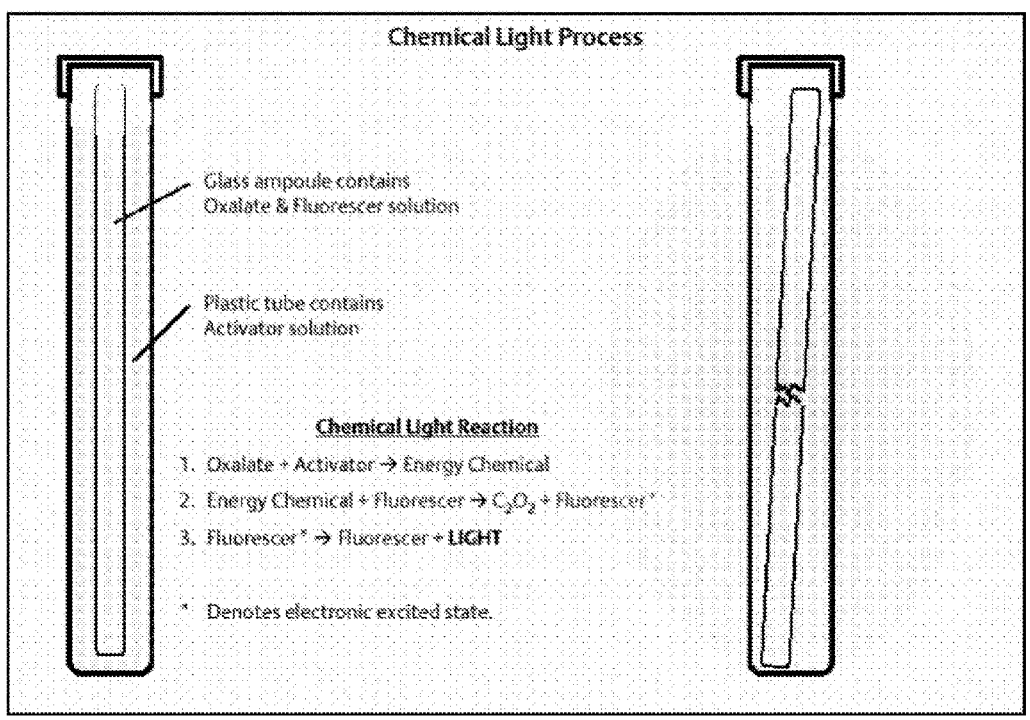
FIG. 1 represents the chemical light process showing the oxalate and fluorescer solution inside a glass ampoule and a plastic tube containing the glass ampoule and activator solution.

The multiple-part marking system of the present disclosure is identifiable, when activated, by both thermal and night vision goggles. More specifically, when the chemicals used in the multiple-part system interact, they react to emit both light and heat. "Activation" as used herein means that a chemical reaction between the multiple components has started.

The multiple-part marking system is comprised of at least two parts, maintained separately until activation. The first part is comprised of at least one oxalate ester, at least one fluorescer, and at least one inorganic salt; the second part is comprised of at least one peroxide and at least one catalyst.

The light and heat are emitted upon the components of the multiple-part system reacting. The intensity of the light and heat emitted increases as the components of the multiple-part system mix, and can reach a peak emission upon complete mixing and reaction of the at least two components together. The speed of mixing of the components is dependant upon the practical application of the marking system. At labscale, the speed of mixing is typically dependant upon how fast one part of the marking system is injected into the second part of the solution. However, when the marking system is employed within munitions or projectiles, the intense speed and rotation of the munitions or projectiles can act to completely mix the multiple-parts together almost instantaneously upon firing, and as such can allow for the peak light and heat emission to be reached almost instantaneously.

The wavelength of light emitted is dependant upon the desired application of the marker and the fluorescer chosen, and can include wavelengths in both the visual and infrared spectrum. It may be preferable to combine multiple fluorescers within one marking system to allow for the emission of light at multiple wavelengths.

The reaction rate of the multiple-part marking system can be dependant upon the amount of catalyst employed and proceeds according to first order kinetics dependant upon the temperature at which the reaction is conducted. The intensity of the light emission can also be dependant upon the amount of catalyst, the completeness of mixing, and the amount of fluorescer employed.

The multiple-part mixing system of the present disclosure has the ability to emit both light and heat. The heat may be, for example, a product of the catalytic breakdown of the hydrogen peroxide by the inorganic salt. However, not all inorganic salts will act to allow the marking system to emit both light and heat. Inorganic salts such as calcium chloride or sodium acetate act to kill the light reaction and do not provide adequate light emission. The at least one inorganic salt useful in the present disclosure are chosen from sodium thiosulphate, potassium thiosulphate, cobalt acetate, copper acetate, lead acetate, cupric chloride, ferric chloride, calcium iodide, potassium iodide, and silver nitrate. In certain embodiments, the at least one inorganic salt is present in an amount ranging from 0.1 percent to 30 percent by weight, based on the total weight of the two-part composition. For example, the at least one inorganic salt can be present in an amount ranging from 1 percent to 30 percent by weight, based on the total weight of the two-part composition, such as from 5 percent to 30 percent by weight, from 5 percent to 25 percent by weight, from 10 percent to 25 percent by weight, and from 10 percent to 20 percent by weight.

The light and heat of the marking system may, in certain embodiments, last for approximately 2 minutes, for up to 20 minutes, or for up to 30 minutes. In other embodiments, the marking system of the present disclosure continues emitting light and heat for at least 30 minutes. These embodiments can enable multiple troop carriers to be able to pass by the same marked target. In such embodiments, a target marked by a first troop carrier will still be visible to a troop carrier farther back on a route, wherein the later troop carrier may be more well-suited to handle the object of the marking. The length of time a marking system maintains its light emission can be a product of the reaction, or can be the result of the catalyst employed. The length of time a marking system maintains its temperature can be dependant upon the thermal mass of the marking system, and therefore a marking system solution maintained within tubing or a contained housing will maintain its heat longer than a marking system solution that is released from its housing and spread out on a target.

The first part of the marking system comprises at least one fluorescer as described above, as well as at least one oxalate ester, and at least one inorganic salt as described above. The first part of the marking system may optionally comprise at least one carrier.

Examples of the at least one oxalate useful in the present disclosure include bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6- dinitrophenyl)oxalate; bis(1,2-dimethyl-4,6-dinitrophenyl) oxalate; bis(2,4-dichlorophenyl)oxalate; bis(2,4-dinitrophenyl)oxalate; bis(2,5-dinitrophenyl)oxalate; bis(2-formyl-4-nitrophenyl)oxalate; bis(pentachlorophenyl) oxalate; bis(1,2-dihydro-2-oxo-1-pyridyl)glyoxal; bis(2,4-dinitro-6-methylphenyl)oxalate; bis-N-phthalimidyl oxalate, and mixtures thereof.

Examples of the at least one fluorescer useful in the present disclosure include 1-methoxy-9,10-bis(phenylethynyl)anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4-methoxyphenyl)anthracene; 9,10-bis(phenylethynyl) anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-di-neopentyl-3,4,9,10-perylene dicarboximide; 1,6,7,12-tetra (p-t-butylphenoxy)N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene, and mixtures thereof.

The amount of the at least one oxalate and the at least one fluorescer employed is upwardly limited only by the solubility of the ester and fluorescer in the solvent chosen. However, as would be appreciated by one in the art, the efficiency of the reaction would decrease at certain high concentrations. In certain embodiments, the at least one oxalate is present in an amount ranging from 3 percent to 60 percent by weight, based on the total weight of the two-part composition. For example, the at least one oxalate can be present in an amount ranging from 3 percent to 50 percent by weight, based on the total weight of the two-part composition, such as from 3 percent to 40 percent by weight, from 3 percent to 30 percent by weight, from 5 percent to 25 percent by weight, and from 7 percent to 25 percent by weight. In certain embodiments, the at least one fluorescer is present in an amount ranging from 0.05 percent to 0.9 percent by weight based on the total weight of the two-part composition. For example, the at least one fluorescer can be present in an amount ranging from greater than 0.05 percent by weight to 0.9 percent by weight, based on the total weight of the two-part composition, such as from greater than 0.1 percent by weight, from greater than 0.2 percent by weight, from greater than 0.3 percent by weight, from greater than 0.4 percent by weight, from greater than 0.5 percent by weight, from greater than 0.6 percent by weight, from greater than 0.7 percent by weight, and from greater than 0.8 percent by weight. In addition, the at least one fluorescer can be present in an amount ranging from 0.05 percent by weight to less than 0.9 percent by weight, based on the total weight of the two-part composition, such as from less than 0.8 percent by weight, from less than 0.7 percent by weight, from less than 0.6 percent by weight, from less than 0.5 percent by weight, from less than 0.4 percent by weight, from less than 0.3 percent by weight, from less than 0.2 percent by weight, and from less than 0.1 percent by weight. It is also intended that the amount of at least one fluorescer can range between any of the numerical values listed above.

The marking system can comprise at least one carrier. Examples of the at least one carrier for the at least first part of the multiple-part marking system useful in the present disclosure include propylene glycol dialkyl ether containing one to three propylene moieties and each alkyl group is independently a straight-chain or branched-chain alkyl group containing up to 8 carbon atoms. Exemplary first solvents include propylene glycol dialkyl ethers containing two propylene moieties such as dipropylene glycol dimethyl ether, dipropylene glycol diethyl ether and dipropylene glycol di-t-butyl ether, dibutyl phthalate, butyl benzoate, propylene glycol dibenzoate, ethyl-hexyl diphenyl phosphate, and mixtures thereof. In certain embodiments, the at least one carrier is present in an amount ranging from 5 percent to 95 percent by weight, based on the total weight of the two-part composition. For example, the at least one carrier can be present in an amount ranging from greater than 5 percent by weight to 95 percent by weight, based on the total weight of the two-part composition, such as from greater than 10 percent by weight, from greater than 20 percent by weight, from greater than 30 percent by weight, from greater than 40 percent by weight, from greater than 50 percent by weight, from greater than 60 percent by weight, from greater than 70 percent by weight, from greater than 80 percent by weight, and from greater than 90 percent by weight. In addition, the at least one carrier can be present in an amount ranging from 5 percent by weight to less than 95 percent by weight, based on the total weight of the two-part composition, such as from less than 90 percent by weight, from less than 80 percent by weight, from less than 70 percent by weight, from less than 60 percent by weight, from less than 50 percent by weight, from less than 40 percent by weight, from less than 30 percent by weight, from less than 20 percent by weight, and from less than 10 percent by weight. It is also intended that the amount of at least one carrier can range between any of the numerical values listed above.

The second part of the marking system comprises at least one peroxide and at least one catalyst. The second part of the marking system may optionally comprise at least one carrier.

Examples of the at least one catalyst useful in the present disclosure includes sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichlorosalicylate; magnesium-3,5,6-trichlorosalicylate, and mixtures thereof. In certain embodiments, the at least one catalyst is present in an amount ranging from 0.0005 percent to 0.5 percent by weight, based on the total weight of the two-part composition. For example, the at least one catalyst can be present in an amount ranging from greater than 0.0005 percent by weight to 0.5 percent by weight, based on the total weight of the two-part composition, such as from greater than 0.001 percent by weight, from greater than 0.005 percent by weight, from greater than 0.01 percent by weight, from greater than 0.05 percent by weight, from greater than 0.1 percent by weight, and from greater than 0.25 percent by weight. In addition, the at least one catalyst can be present in an amount ranging from 0.0005 percent by weight to less than 0.5 percent by weight, based on the total weight of the two-part composition, such as from less than 0.1 percent by weight, from less than 0.05 percent by weight, from less than 0.01 percent by weight; from less than 0.005 percent by weight, and from less than 0.001 percent by weight. It is also intended that the amount of at least one carrier can range between any of the numerical values listed above.

Examples of the at least one peroxide useful in the present disclosure include hydrogen peroxide; sodium peroxide; sodium perborate; sodium pyrophosphate peroxide; urea peroxide; histidine peroxide; t-butyl-hydroperoxide; and peroxybenzoic acid, and mixtures thereof. In certain embodiments, the at least one peroxide is present in an amount ranging from 0.25 percent to 25 percent by weight, based on the total weight of the two-part composition. For example, the at least one peroxide can be present in an amount ranging from 0.25 percent to 20 percent by weight, based on the total weight of the two-part composition, such as from 0.5 percent to 20 percent by weight, from 0.5 percent to 15 percent by weight, from 0.5 percent to 10 percent by weight, and from 0.5 percent to 6 percent by weight. In certain embodiments, the at least one peroxide of the present disclosure can be hydrogen peroxide.

Examples of the at least one carrier for the at least one second part of the multiple-part marking system useful in the present disclosure include dimethyl phthalate, triethyl citrate, ethylene glycol dibenzoate, and mixtures thereof.

Additional components that may be present in either component of the multiple-part marking system include, but are not limited to, thickeners to allow the marker to stick to the target better, fluorescent powders for day time target marking, and antifreeze agents to prevent freezing, film formers, gelling agents, polyacrylamides, and polyvinylchloride. These additional components are those well known in the art to be suitable for the above purposes.

The marking system of the present disclosure can be contained in any suitable housing or container. In certain embodiments, the container separates the at least two parts of the marking system from interacting prior to the time marking is desired. In additional embodiments, the container can be comprised of hollow flexible tubing containing therein a) at least a first solution comprised of at least one oxalate ester, at least one fluorescer, and at least one inorganic salt, and b) at least one sealed glass vial containing therein at least a second solution of at least one peroxide and at least one catalyst, wherein the at least one sealed glass vial can be comprised within the first solution inside the hollow flexible tubing, and wherein when the glass vial breaks the two parts can mix and react together. The flexible tubing can be sealed at both ends and can be comprised of an opaque or transparent plastic. The light and heat can be generated when the flexible tubing is flexed, causing the glass vial inside to break, allowing mixing of the at least two solutions. Placing the marking system within flexible plastic tubing can act to prevent premature breaking of the glass vial and prevent premature mixing of the chemicals. FIG. 1, represents a schematic of one type of flexible plastic tubing/glass vial structure that may contain the multiple-part marking system of the present disclosure.

A method of signaling is disclosed herein, wherein the multiple-part marking system can be activated by physically making the at least one part of the marking system comprised of at least one fluorescer, at least one oxalate ester, and at least one inorganic salt, mix and react with the at least second part of the marking system comprised of at least one peroxide and at least one catalyst; wherein light and heat can be generated. In certain embodiments, the method includes the multiple-part marking system being present in hollow flexible tubing containing therein a) at least a first solution comprised of at least one oxalate ester, at least one fluorescer, and at least one inorganic salt; and b) at least one sealed glass vial containing therein at least a second solution of at least one peroxide and at least one catalyst; wherein the sealed glass vial is comprised within the first solution inside the hollow flexible tubing, and comprises flexing the tubing and breaking the glass vial contained therein; allowing the mixing of the two solutions.

The marking system of the present disclosure can also be used in projectiles of all types, wherein it is desired to mark the target of the projectile. In certain embodiments, the marking system can be included within the projectile in the above described flexible tubing and glass vial configuration. Projectiles may be of the type such as 18 mm rocket propelled grade munitions, howitzer shells, gravity bombs, and may also include smaller caliber munitions, such as for use in pistols or guns, medium caliber munitions, such as those ranging from 20 mm to 83 mm, and larger caliber munitions, such as those ranging from 83 mm to 155 mm.

A method of marking is also disclosed herein, comprising the steps of launching a projectile containing a multiple-part chemiluminescent and thermal marking system, wherein at least a first part comprising at least one oxalate ester, at least one fluorescer, and at least one inorganic salt is separated by at least one breakable barrier from at least a second part comprising at least one peroxide and at least one catalyst; breaking the at least one barrier between the at least first part and the at least second part; generating light and heat as products of the reaction between the at least first part and the at least second part, and marking a target hit by the projectile with the activated multiple-part chemiluminescent and thermal marking system.

The marking system of the present disclosure may also act as a tracer, wherein the light and heat generated as a result of the reaction is visible during the flight of the projectile.

The hollow plastic tubing may be of any size or shape suitable for holding a glass vial and the multiple-part marking system as described herein, and as needed for the application intended.

EXAMPLES

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

As used herein, the light emitted by the marking system is measured using a light meter with a probe chosen dependant upon the light being emitted (infrared, visual, etc). For example, for light emission in the visible spectrum an irradiance probe is used. One of ordinary skill in the art would be well aware of how to select a probe suitable for measuring the wavelength of light the marking system has been designed to emit. The light emission is presented in LUX units. A thermocouple is placed within the oxalate solution of the present examples to measure the temperature output of the marking system, in Celsius.

Example 1

A two part marking system according to the foregoing disclosure was prepared, activated, and the results measured. The first part of the marking system comprised 23.5% by weight bis(2,4,5-trichloro-6-carbopentoxyphenyl)oxalate, 0.25% by weight rubrene, 0.2% by weight sodium thiosulphate, and 76.25% by weight propylene glycol dibenzoate. The second part of the marking system comprised 6% by weight of 50% hydrogen peroxide, 0.2% sodium salicylate, and 93.8% by weight triethyl citrate. The two parts were constituted separately and then combined for testing the light and temperature output of the system when activated.

The system was tested by putting 4.8 grams of the first part within a narrow open topped plastic tube. Thereafter, 5.6 grams of the second part were placed in a syringe, and then injected directly into the plastic tube containing the first part. Light and heat output were measured using a thermocouple and light meter with an irradiance probe. Light was generated instantly upon injection and generated a peak emission of approximately 2000 LUX. The temperature of the solution increased from room temperature of approximately 24° C. to a peak temperature of approximately 55° C. within 4 seconds.

Example 2

A two part system according to the foregoing disclosure was prepared, activated, and the results determined. The first part of the system comprised 23.5% by weight bis(2,4,5-trichloro-6-carbopentoxyphenyl) oxalate, 0.25% by weight rubrene, 0.2% by weight sodium thiosulphate, and 76.25% by weight propylene glycol dibenzoate. The second part of the system comprised 6% by weight of 50% hydrogen peroxide, 0.1% sodium salicylate, and 93.8% by weight triethyl citrate. The two parts were constituted separately and packaged within an insert that was assembled into a shotgun shell as a training tracer as described in U.S. Pat. No. 7,610,857. A second shotgun shell was assembled with all the components identical to the first shotgun shell described above, with the exception that sodium thiosulphate was not included.

Both shotgun shells were cooled in a freezer to below the freezing point of water and maintained at that low temperature during transportation to a shooting site by packing the shells on ice in an insulated container. At the shooting site, both shotgun shells were fired from a shotgun. The shells were fired outside during daylight hours. There were four observers present at the shooting site during this test: the shooter and three non-shooting observers. All four of the observers could readily see the shotgun shell containing the sodium thiosulphate. No observer could see the shotgun shell containing zero sodium thiosulphate.

Example 3

A two part system according to the foregoing disclosure was prepared, activated, and the results determined. The first part of the system comprised 23.5% by weight bis(2,4,5-trichloro-6-carbopentoxyphenyl)oxalate, 0.25% by weight rubrene, 0.2% by weight sodium thiosulphate, and 50% by weight propylene glycol dibenzoate, and 26.5% by weight bis(2-methoxyethyl)ether)(diglyme). The second part of the system comprised 25% by weight of 50% hydrogen peroxide, 0.1% sodium salicylate, and 25% by weight diglyme, and 49.9% by weight triethyl citrate. The two parts were constituted separately and chilled to −40° C. in a dry ice plus antifreeze bath. The two parts were mixed and light was immediately generated. The temperature of the solution increased from −40° C. to 10° C. within 4 seconds. A second set of solutions identical to those just described was also prepared, with the exception that sodium thiosulphate was not added to the oxalate ester solution. The two parts were again constituted separately and chilled to −40° C. Upon mixing, no light was generated and no temperature change was noted.

Other embodiments of the disclosure will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A multiple-part marking system that comprises at least one first part comprising at least one oxalate ester, at least one fluorescer, and at least one inorganic salt; and at least one second part comprising at least one peroxide and at least one catalyst; wherein light and heat are emitted when the two parts interact;

wherein the at least one inorganic salt is present in an amount ranging from 0.1 percent to 30 percent by weight, based on the total weight of the two-part composition; and wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate.

2. The multiple-part marking system according to claim 1, wherein the at least one oxalate ester is chosen from bis(2,4,5-trichloro-6-carbopentoxyphenyl)oxalate; bis(2,4,5-trichlorophenyl)oxalate; bis(2,4,5-tribromo-6-carbohexoxyphenyl)oxalate; bis(2-nitrophenyl)oxalate; bis(2,4-dinitrophenyl)oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl)oxalate; bis(1,2-dimethyl-4,6-dinitrophenyl)oxalate; bis(2,4-dichlorophenyl)oxalate; bis(2,4-dinitrophenyl)oxalate; bis(2,5-dinitrophenyl)oxalate; bis(2-formyl-4-nitrophenyl)oxalate; bis(pentachlorophenyl)oxalate; bis(1,2-dihydro-2-oxo-1-pyridyl)glyoxal; bis(2,4-dinitro-6-methylphenyl)oxalate; bis-N-phthalimidyl oxalate.

3. The multiple-part marking system according to claim 1, wherein the at least one oxalate ester is present in an amount ranging from 3 percent to 60 percent by weight, based on the total weight of the two-part composition.

4. The multiple-part marking system according to claim 1, wherein the at least one fluorescer is chosen from 1-methoxy-9,10-bis(phenylethynyl) anthracene, perylene, rubrene, 16,17-didecycloxyviolanthrone, 2-ethyl-9,10-bis(phenylethynyl)anthracene; 2-chloro-9,10-bis(4-ethoxyphenyl)anthracene; 2-chloro-9,10-bis(4-methoxyphenyl)anthracene; 9,10-bis(phenylethynyl) anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenylanthracene; 1,6,7,12-tetraphenoxy-N,N'-bis(2,6-diisopropylphenyl)-3,4,9,10-perylene dicarboximide; 1,6,7,12-tetraphenoxy-N,N-bis(2,5-di-t-butylphenyl)-3,4,9,10-perylene dicarboximide;

1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-dineopentyl-3,4,9,10-perylene dicarboximide; 1,6,7,12-tetra(p-t-butylphenoxy)N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; 1,4-dimethyl-9,10-bis(phenylethynyl)anthracene.

5. The multiple-part marking system according to claim 1, wherein the at least one fluorescer is present in an amount ranging from 0.05 percent to 0.9 percent by weight, based on the total weight of the two-part composition.

6. The multiple-part marking system according to claim 1, wherein the at least one peroxide is chosen from hydrogen peroxide; sodium peroxide; sodium perborate; sodium pyrophosphate peroxide; urea peroxide; histidine peroxide; t-butyl-hydroperoxide; and peroxybenzoic acid.

7. The multiple-part marking system according to claim 1, wherein the at least one peroxide is present in an amount ranging from 0.25 percent to 25 percent by weight, based on the total weight of the two-part composition.

8. The multiple-part marking system according to claim 1, wherein the at least one catalyst is chosen from sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichloro-salicylate; magnesium-3,5,6-trichlorosalicylate.

9. The multiple-part marking system according to claim 1, wherein the at least one catalyst is present in an amount ranging from 0.0005 percent to 0.5 percent by weight, based on the total weight of the two-part composition.

10. The multiple-part marking system according to claim 1 further comprising at least one carrier present in an amount ranging from 5 percent to 95 percent by weight, based on the total weight of the two-part composition.

11. A chemiluminescent and thermal marker comprising hollow flexible tubing comprising:
a) at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, and wherein the at least one inorganic salt is present in an amount ranging from 0.1 percent to 30 percent by weight, based on the total weight of the two-part composition;
b) at least one sealed glass vial comprising therein at least one second part comprising at least one peroxide and at least one catalyst;
wherein the at least one sealed glass vial is comprised within the at least one first part, and wherein breaking the at least one sealed glass vial will cause the at least one first part and the at least one second part to mix and react together.

12. A projectile comprised of a multiple-part chemiluminescent and thermal marker within the projectile, wherein the multiple-part chemiluminescent and thermal marker comprises
at least one first part comprising at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, and wherein the at least one inorganic salt is present in an amount ranging from 0.1 percent to 30 percent by weight, based on the total weight of the two-part composition;
at least one breakable barrier separating the at least one first part from at least one second part comprising at least one peroxide and at least one catalyst;
wherein light and heat are emitted when the at least one breakable barrier is broken.

13. A projectile according to claim 12 wherein the multiple-part chemiluminescent and thermal marker comprised within the projectile is housed in hollow flexible tubing, wherein the at least one first part is present within the tubing, and wherein the flexible tubing also comprises at least one sealed glass vial containing the at least one second part; and wherein the parts are mixed as a result of the tubing being flexed and the glass vial breaking and releasing the at least one second part.

14. A method of marking a target comprising:
a) launching a projectile containing a multiple-part chemiluminescent and thermal marking system,
wherein at least one first part of the multiple-part chemiluminescent and thermal marking system comprises at least one oxalate ester, at least one fluorescer, and at least one inorganic salt, wherein the at least one inorganic salt is chosen from sodium thiosulphate, potassium thiosulphate, cobalt acetate, copper acetate, lead acetate, cupric chloride, ferric chloride, calcium iodide, potassium iodide, and silver nitrate, and wherein the at least one inorganic salt is present in an amount ranging from 0.1 percent to 30 percent by weight, based on the total weight of the two-part composition,
at least one breakable barrier separating the at least one first part from at least a second part comprising at least one peroxide and at least one catalyst;
b) breaking the at least one breakable barrier between the at least one first part and the at least one second part;
c) generating light and heat as products of the reaction between the at least first part and the at least second part; and
d) marking a target hit by the projectile with the activated multiple-part chemiluminescent and thermal marking system.

* * * * *